(12) United States Patent
Minata

(10) Patent No.: US 6,392,532 B2
(45) Date of Patent: *May 21, 2002

(54) WIRELESS APPARATUS WITH DATA CONVERTING FUNCTION

(75) Inventor: Shigeki Minata, Shizuoka (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/085,040

(22) Filed: May 27, 1998

(30) Foreign Application Priority Data

Jun. 10, 1997 (JP) .............................. 9-152653

(51) Int. Cl.7 ................................. H04Q 7/14
(52) U.S. Cl. .................... 340/7.48; 340/7.52; 340/7.56; 340/825.27
(58) Field of Search ........................ 340/825.44, 825.52, 340/825.55, 311.1, 825.47, 825.27, 7.48, 7.52, 7.55, 7.56; 345/112, 115, 473

(56) References Cited

U.S. PATENT DOCUMENTS

| | | | | |
|---|---|---|---|---|
| 4,951,039 A | * | 8/1990 | Schwendeman | 345/473 |
| 5,128,665 A | * | 7/1992 | Deluca | 340/825.47 |
| 5,347,452 A | * | 9/1994 | Bay, Jr. | 364/408 |
| 5,416,473 A | * | 5/1995 | Dulaney | 340/825.44 |
| 5,784,001 A | * | 7/1998 | Deluca et al. | 340/825.44 |
| 5,966,113 A | * | 10/1999 | Hidaka et al. | 345/112 |
| 6,011,954 A | * | 1/2000 | Kroll | 340/7.52 |

FOREIGN PATENT DOCUMENTS

| | | |
|---|---|---|
| JP | 62-181534 | 8/1987 |
| JP | 6-37701 | 2/1994 |
| JP | 8-55153 | 2/1996 |
| JP | 8-237714 | 9/1996 |
| JP | 9-51566 | 2/1997 |
| JP | 9-163426 | 6/1997 |

* cited by examiner

Primary Examiner—Edwin C. Holloway, III
(74) Attorney, Agent, or Firm—McGinn & Gibb, PLLC

(57) ABSTRACT

In a wireless apparatus, a receiving unit receives a wireless signal, extracts a call number and a reception data subsequent to the call number from the received signal. Also, the receiving unit generates a determination signal indicative of whether a message reception mode or an information reception mode is set for the call number. A data converting unit performs a data conversion to the reception data based on a data conversion format for the call number to produce a new data when the determination signal indicates the information reception mode. A control unit displays the new data on a display unit.

20 Claims, 6 Drawing Sheets

Fig. 1 PRIOR ART

```
AAA      $105      +0.10
BBB      $ 90      -0.10
CCC      $112      +0.00

3:05PM    MAR/17/97
```

WIRELESS APPARATUS WITH DATA CONVERTING FUNCTION

BACKGROUND OF THE INVENTION

1. Field of the Invention

The present invention relates to a wireless apparatus, and more particularly to a wireless apparatus with a function to convert the data format of a received data.

2. Description of the Related Art

A wireless apparatus receives a desired data and displays the received data on a display section. At this time, when the received data is merely displayed without application of any processing, a sequence of characters or numerals of the received data is merely displayed, as shown in FIG. 1. Accordingly, it is difficult to recognize, for example, the temporal change of the desired data. Especially, in a portable information receiver such as a pager, because a memory capacity is limited, a system is generally adopted in which only the latest information is stored. For this reason, it is not possible to display the data previously received once again. Thus, in a portable information receiver, it is difficult to recognize the temporal change of the data further than in the above-mentioned wireless apparatus.

An information display apparatus is disclosed in Japanese Laid Open Patent Disclosure (JP-A-Heisei 8-55153), in which the temporal change of a data can be easily recognized. In this information display apparatus, received stock market data are classified and rearranged for every category of business and displayed in a graph form, to allow stock market data to be visually recognized.

FIG. 2 is a block diagram illustrating the structure of the information display apparatus mentioned above. Referring to FIG. 2, the information display apparatus is composed of a CPU 111, a receiving unit 112, a data storage area 113, an input unit 114, a main memory having a program area and a work area, an external storage unit 116, and a display unit. The receiving unit 112 receives a stock market data which is sent through a communication channel, and the CPU 111 stores the received stock market data in the data storage unit 113. A company name is designated through the input unit 114. The CPU 111 classifies the stock market data which has been stored in the data storage unit 113 in accordance with the designated company name and rearranges them in order. Then, the CPU 111 displays the stock market data for the designated company name on the display unit 117. Also, the CPU 111 displays the quantities of sold and bought stocks for the designated company name with different colors in the form of graph on the display unit 117.

However, in the above information display apparatus, since the received data is used for a data base, the received data is stored just as it is received without application of any processing. In addition, the data converted into the form of graph is also stored. For this reason, there is a problem in that the quantity of data to be stored increases. In accordance with, the sufficiently large memory capacity must be provided previously in the information display apparatus. This is a fatal problem, especially, in the portable information receiver such as a pager in which the memory capacity to be mounted is limited.

SUMMARY OF THE INVENTION

The present invention is accomplished in view of the above problems. Therefore, an object of the present invention is to provide a wireless apparatus, in which a received data is converted to have a data format and stored in a memory so that a data quantity can be reduced.

Another object of the present invention is to provide a wireless apparatus in which the temporal change of a sequence of received data can be displayed and easily recognized.

In order to achieve an aspect of the present invention, a wireless apparatus includes a receiving unit for receiving a wireless signal, for extracting a call number and a reception data subsequent to the call number from the received signal, and for generating a determination signal indicative of whether a message reception mode or an information reception mode is set for the call number, a display unit, a data converting unit for performing a data conversion to the reception data based on a data conversion format for the call number to produce a new data when the determination signal indicates the information reception mode, and a control unit for displaying the new data on the display unit.

The wireless apparatus may further include a storage unit, and the data converting unit stores the new data in the storage unit. Alternatively, the wireless apparatus may further includes a storage unit in which an old data which is already subjected to the data conversion and stored therein. In this case, the data converting unit reads the old data from the storage unit, integrates the old data and the new data to produce an integration data, and stores the integration data in the storage unit. Also, the control unit displays the integration data on the display unit instead of the new data.

The integration data is desirably displayed in a graph form.

The control unit previously designates the data conversion format for the call number in response to an instruction from a user. More particularly, the data converting unit stores a plurality of data conversion formats, and the control unit previously selects one of the plurality of data conversion formats for the call number in response to the instruction from the user.

In order to achieve another aspect of the present invention, a method of displaying a temporal change of a received data in a wireless apparatus, comprising the steps of:

receiving a wireless signal;

extracting a call number and a reception data subsequent to the call number from the received signal;

generating a determination signal indicative of whether a message reception mode or an information reception mode is set for the call number;

performing a data conversion to the reception data based on a data conversion format for the call number to produce a new data when the determination signal indicates the information reception mode; and displaying the new data on the display unit.

In order to achieve still another aspect of the present invention, a wireless apparatus includes a receiving section for receiving a wireless signal, and for extracting a call number and a reception data subsequent to the call number from the received signal, a determining section for determining whether a message reception mode or an information reception mode is set for the call number, to generate a determination signal, a converting section for performing a data conversion to the reception data based on a data conversion format for the call number to produce a new data when the determination signal indicates the information reception mode, and a display section for displaying the new data on the display unit.

BRIEF DESCRIPTION OF THE DRAWINGS

FIG. 1 is a diagram illustrating a display example of a received data in a conventional wireless apparatus;

DESCRIPTION OF THE PREFERRED EMBODIMENTS

Next, the wireless apparatus of the present invention will be described below in detail with reference to the attached drawings.

Figure 2:
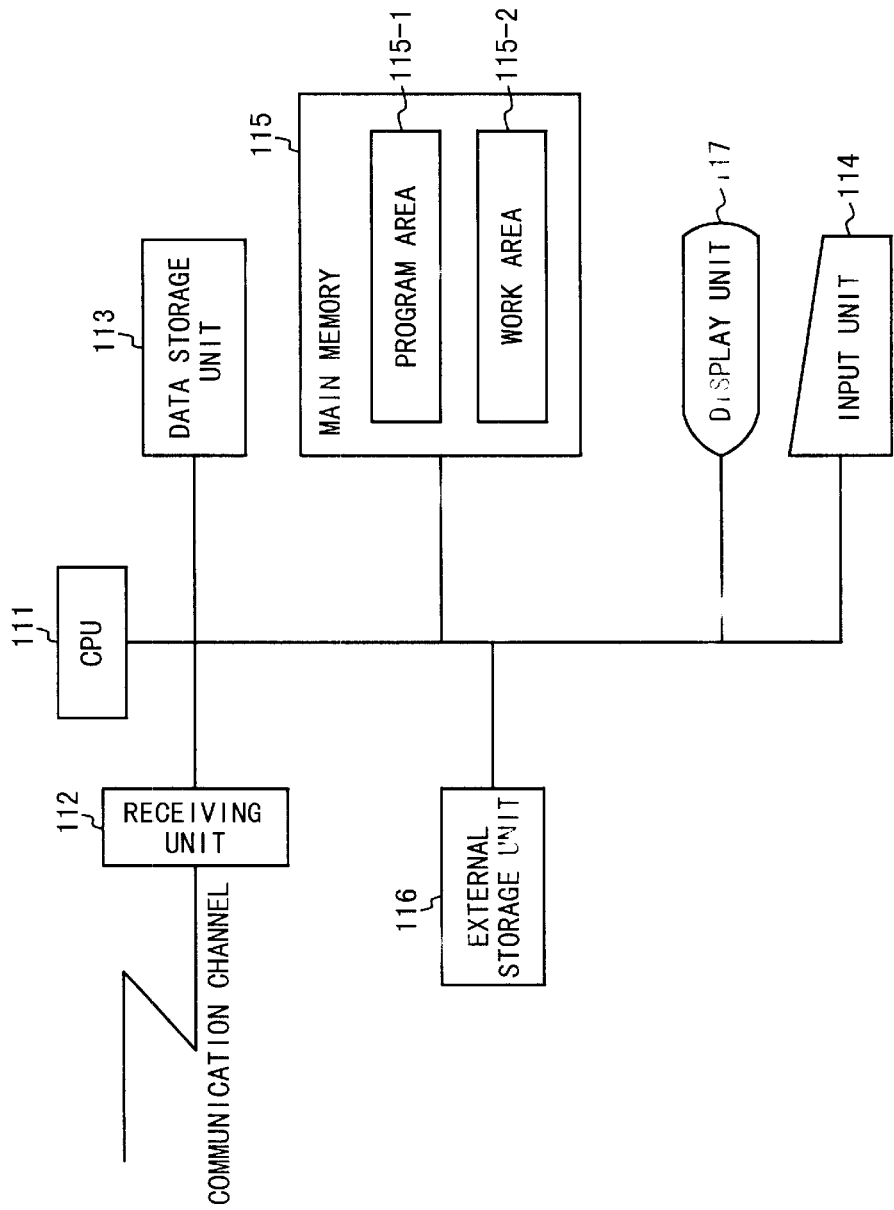
FIG. 2 is a block diagram illustrating the structure of a conventional information display apparatus.
Figure 3:
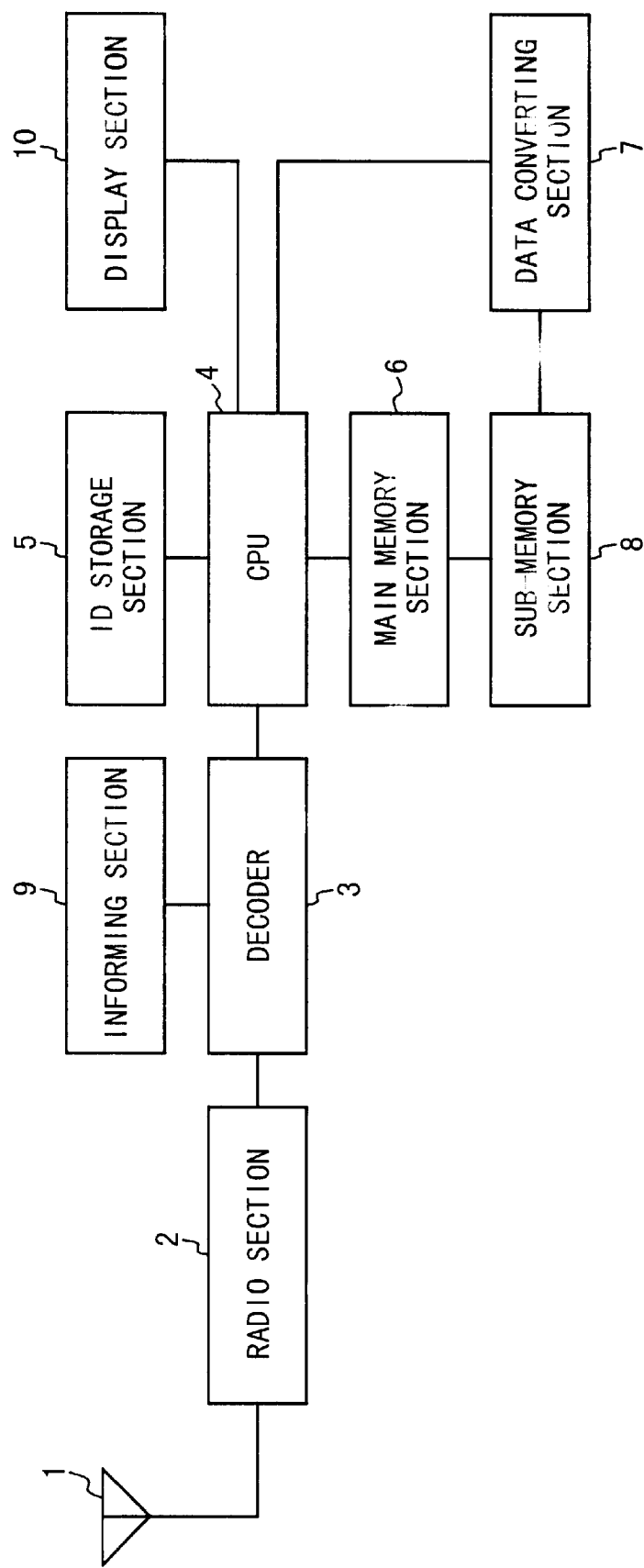
FIG. 3 is a block diagram illustrating the structure of a wireless apparatus according to an embodiment of the present invention.

FIG. 3 is a block diagram illustrating the structure of the wireless apparatus according to an embodiment of the present invention. Referring to FIG. 3, the wireless apparatus is composed of an antenna 1, a radio section 2, a decoder 3, a CPU 4, an identifier (ID) storage section, a main memory section 6, a data converting section 7, a sub-memory section 8, an informing section 9 and a display section 10. The antenna 1 receives a wireless signal, and the radio section 2 amplifies and demodulates the received wireless signal, and the decoder 3 processes the demodulated signal. The CPU 4 controls a receiving operation by the radio section 2 and the decoder 3. Also, the CPU controls the whole of the wireless apparatus. The ID storage section 5 stores identification numbers of the wireless apparatus. The data converting section 7 stores a plurality of data conversion formats. Each of designated ones of the identification numbers is related one of the plurality of data conversion formats. Also, the data converting section executes a data converting operation based on a set data conversion format under the control of the CPU 4. The main memory section 6 stores received message information, and the sub-memory section 8 stores a data which is subjected to the data conversion. The informing section 9 informs the reception of any data to a user under the control of the CPU 4, and the display section 10 displays the received message information and the data which is subjected to the data conversion, under the control of the CPU 4.

Next, the operation of the wireless apparatus according to the embodiment of the present invention will be described below.

The wireless apparatus previously stores identification numbers for itself in the ID storage section 5. A normal message reception mode or an information reception mode can be set for each of the identification numbers. A data indicative of whether the normal message reception mode or the information reception mode is set is stored in the ID storage section 5 together with the identification number. The user of the wireless apparatus can previously set the data conversion format in the data converting section 7 in the case where a data received in the information reception mode should be displayed on the display section 10.

A wireless signal is received by the antenna 1, is amplified and demodulated by the radio section 2, and is supplied to the decoder 3. The decoder 3 extracts a call number from the demodulated signal and a data subsequent to the call number. Since the identification numbers have been already stored in the ID storage section 5, the decoder 3 refers to the identification numbers of the wireless apparatus through the CPU 4 to compare the call number of the demodulated signal with the referred identification numbers. If the call number of the demodulated signal is coincident with one of the referred identification numbers as the result of the comparison, the decoder 3 determines whether or not the normal message reception mode or the information reception mode is set for the call number. Then, the decoder 3 supplies a determination signal indicative of the normal message reception mode or the information reception mode set for the call number to the CPU 4. Also, the decoder 3 supplies a received data of a signal of the demodulated signal subsequent to the call number to the CPU 4.

If the determination signal indicates the normal message reception mode, the CPU 4 displays a message of the received data on the display section 10. Also, the CPU 4 outputs a reception informing signal to the decoder 3 such that the decoder 3 drives the informing section 9 to inform the message reception to the user. Further, the CPU 4 stores the received message in the main memory section 6. The above operation is the reception processing operation.

On the other hand, if the determination signal indicates the information reception mode, the CPU determines whether or not the data conversion format has been previously set in the data conversion section 7. If the data conversion format has been set, the CPU 4 controls the data converting section 7 to convert the received data based on the set data conversion format to produce a new data. In this case, when an old data which has been already subjected to the data format conversion is stored in the sub-memory section 8, the data converting section 7 reads a necessary portion of the old data from the sub-memory section 8. Then, the data converting section 7 integrates the new data and the read old data portion. The CPU 4 displays the integrated data on the display section 10 as a conversion data. Also, the conversion data is stored in the sub-memory section 8. When any data conversion format is not set in the data converting section 7, the above-mentioned reception processing is performed as in the normal message reception mode.

Figure 4:
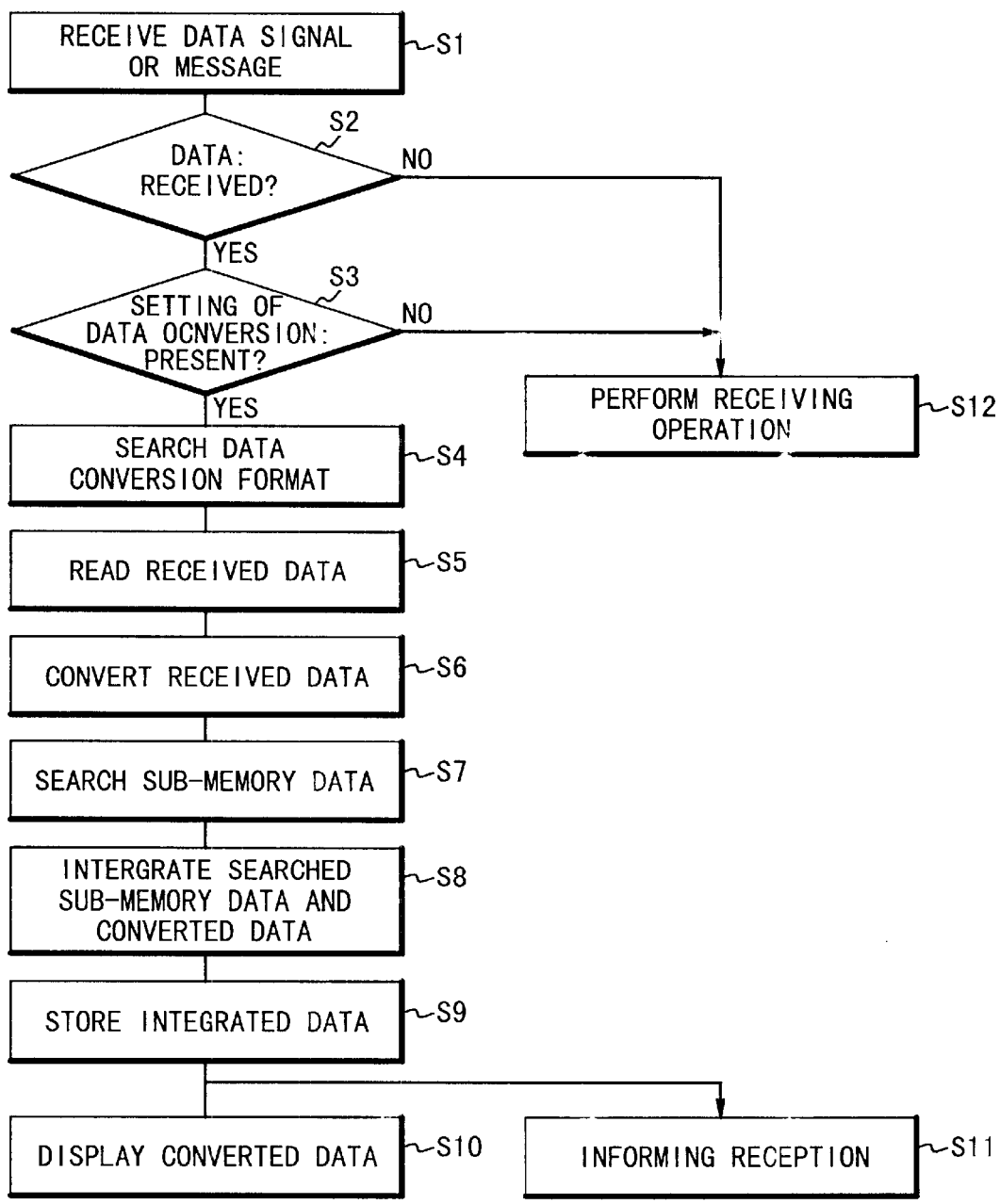
FIG. 4 is a flow chart illustrating a data conversion operation of the wireless apparatus according to the embodiment of the present invention.

Next, the operations of CPU 4 and data conversion section 7 will be described in detail with reference to FIG. 4.

First, to the CPU 4 is supplied the determination signal indicative of the message reception mode or the information reception mode for the call number contained in the received wireless signal and the data subsequent to the call number (Step S1). The CPU 4 determines whether or not a normal message signal or an information signal is received, based on the determination signal (Step S2). If the determination signal indicates the normal message reception mode, the CPU 4 executes the reception processing operation such as the reception informing operation and the message displaying operation (Step S12). On the other hand, if the determination signal indicates the information reception mode, the CPU 4 determines whether or not the data conversion format for the call number is previously set in the data converting section 7 (Step S3). If not set, the CPU executes the above-mentioned reception processing operation (Step S12).

If the data conversion format is set, the data converting section 7 searches the data conversion format for the call number in the information reception mode (Step S4). Then, the data converting section 7 receives the received data as a new data from the CPU 4 (Step S5). The new data is converted based on the searched data conversion format (Step S6).

Subsequently, the data converting section 7 searches the sub-memory section 8 for an old data for the call number. The old data is already received and converted into the data conversion format (Step S7). The searched old data is integrated with the new data to produce an integration data (Step S8). The integration data is stored in the sub-memory section 8 (Step S9). Further, the CPU 4 receives the integration data from the data converting section 7 and supplies as a display data to the display section 10 (Step S10). As a result, the integration data is displayed on the display section 10. At the same time, the CPU 4 controls the decoder 3 to drive the informing section 9 for the information of the reception (Step S11).

When it is determined in the step S7 that there is no old data which is stored in the sub-memory section 8, the above-mentioned operation may be executed to only the received new data. Instead, the operation in the step S12 may be executed.

Figure 5:
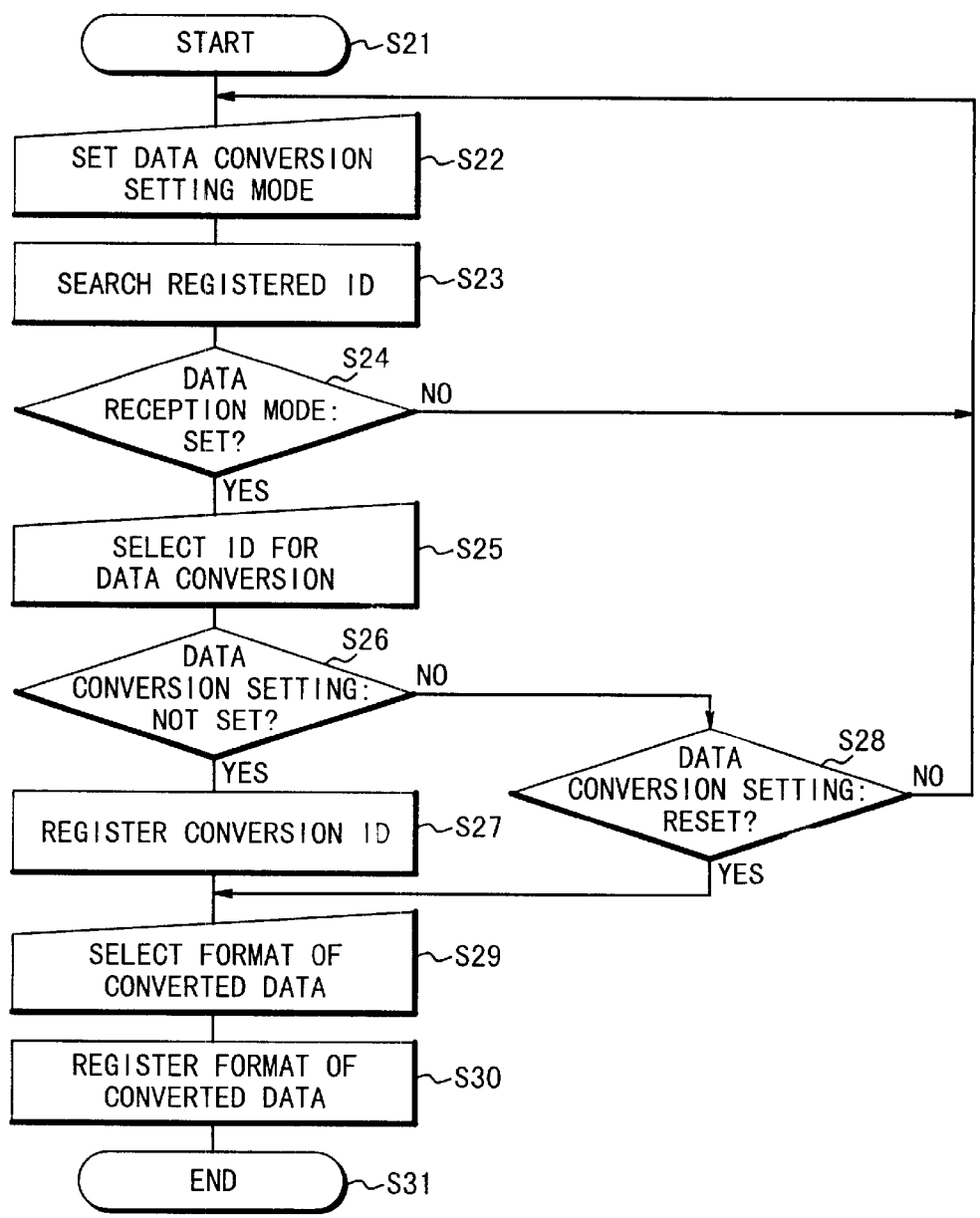
FIG. 5 is a flow chart illustrating a data conversion format setting operation of the wireless apparatus according to the embodiment of the present invention.

FIG. 5 shows a flow chart for explanation of the data conversion format setting operation in the wireless apparatus according to the embodiment of the present invention.

Referring to FIG. 5, when the wireless apparatus is in a normal wait state (step S21), the user selects a data conversion format setting mode (Step S22). The CPU 4 searches the identification numbers of the wireless apparatus which are previously registered on the ID storage section 5 (Step S23) to determine whether or not information reception mode is set to each of the searched identification numbers (Step S24). If the information reception mode is not set, the control returns to the wait state again.

When there is the identification numbers for which the information reception mode is set, the user selects one of the identification numbers for which the information reception mode is set (Step S25). The CPU 4 determines whether a data conversion format is already set for the selected identification number (Step S26). When the data conversion format is not yet set, the CPU 4 registers the selected identification number as the identification number for the information reception mode (Step S27). Further, the CPU 4 selects one of the data conversion formats previously stored in the data converting section 7 for the registered identification number in response to an instruction from the user (Step S29).

On the other hand, when the data conversion format is already set, the user determines whether or not the set data conversion format should be reset (Step S28). When the set data conversion format should not be reset, the control returns to the wait state.

When the set data conversion format should be reset, the data conversion format is selected for the selected identification number and then the control advances to the conversion setting (Step S29). The data conversion format selected in the step S29 is registered on the data converting section 7 (Step S30). Thus, a data conversion format setting mode is ended (Step S31).

When a plurality of identification numbers are registered for the information reception mode, the control from the step S25 to the step S30 is repeated.

Figure 6A:
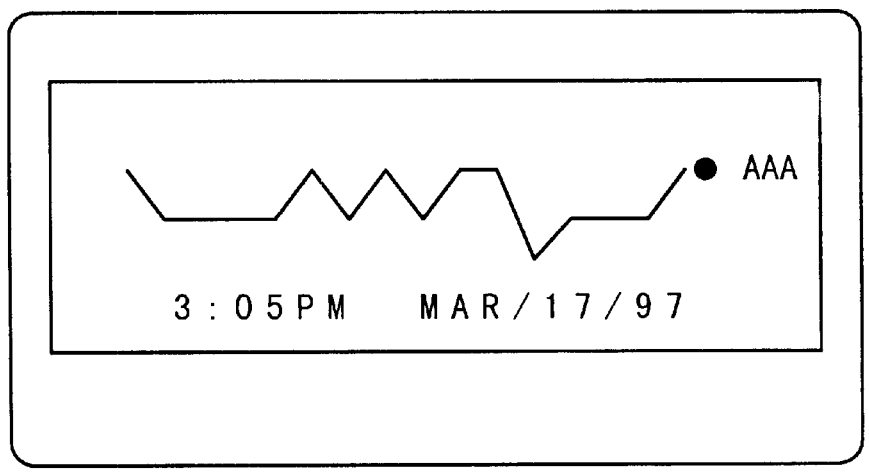
FIGS. 6A and 6B are diagrams illustrating the display examples of data in the wireless apparatus of the present invention.
Figure 6B:
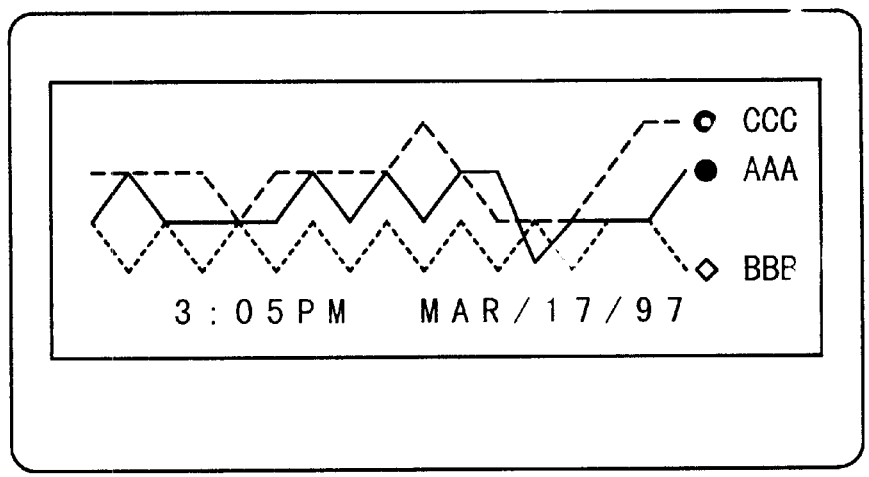

FIGS. 6A and 6B show display examples in the wireless apparatus according to the present invention. FIG. 6A is a display example in which only the integration data of "AAA" is extracted from the sub-memory section 8 and is displayed on the display section 10. FIG. 6B is a display example in which all the integration data are displayed. These display examples allows the user to easily recognize the temporal change of the received data.

It should be noted that the wireless apparatus of the present invention may be provided with the transmitting function in addition to the receiving function as mentioned above.

As described above, according to the wireless apparatus of the present invention, the received data is converted to have a data conversion format and is stored in the memory section. Because it is not necessary that the received data is stored just as it is received, the data quantity is possible to be reduced. As a result, the increase of the memory capacity can be suppressed as less as possible.

Also, because the setting of a plurality of data conversion formats is possible, one wireless apparatus can be applied to various types of processing.

Further, a newly received data is converted in accordance with the selected data conversion format and is integrated with an old data which has been already converted to produce an integration data. Then, the integration data is stored in the memory section. Thus, the data quantity can be further reduced.

In addition, because the data converting section can convert the integration data into the graph data format, the temporal change of the data can be easily recognized.

According to the present invention, even if the wireless apparatus is a portable type wireless apparatus in which the memory capacity is limited, the increase of the memory capacity can be sufficiently suppressed as described above.

What is claimed is:

1. A wireless apparatus comprising:
   a receiving unit for receiving a wireless signal, for extracting from said received signal a call number and a reception data subsequent to said call number; and for generating a determination signal indicative of whether a message reception mode or an information reception mode is set for said call number;
   a display unit;
   a storage unit storing at least one identification number, each said at least one identification number having an associated indicator of a reception mode, said reception mode comprising one of a mesage reception mode and an information reception mode, such that each said identification number having said information reception mode indicator has an additional associated indicator for a data conversion format;
   a comparator for determining whether said call number matches one of said at least one identification number;
   a data converting unit for performing a data conversion on said reception data when said call number matches one of said at least one identification number and said determination signal indicates said information reception mode, said data conversion executed in accordance with a data conversion format corresponding to said data conversion format indicator associated with said identification number matching said call number, said data conversion producing a new information data for said reception data; and
   a control unit for displaying said new data on said display unit.

2. A wireless apparatus according to claim 1
   wherein said data converting unit additionally stores said new data in said storage unit to become old data.

3. A wireless apparatus according to claim 1,
   wherein said data converting unit additionally determines whether any previously converted data for said call number is stored in said storage unit as old data and reads said old data from said storage unit, integrates said old data and said new data to produce an integration data, and stores said integration data in said storage unit to become a replacement old data.

4. A wireless apparatus according to claim 3, wherein said control unit displays one of said integration data and said new data, based on an operator input.

5. A wireless apparatus according to claim 4, wherein said integration data is displayed in a graph form.

6. A wireless apparatus according to claim 1, wherein said control unit previously designates said data conversion format corresponding to said call number in response to an instruction from a user.

7. A wireless apparatus according to claim 1, wherein said data converting unit stores a plurality of data conversion formats and each said data conversion format indicator points to one of the plurality of data conversion formats.

8. A wireless apparatus according to claim 1, wherein said wireless apparatus comprises a portable wireless apparatus.

9. A method of displaying a temporal change of a received data in a wireless apparatus, comprising:

receiving a wireless signal;

extracting from the received signal a call number and a reception data;

comparing said call number with a listing containing at least one identification number stored in a memory and retrieving additional information associated with any of a matched identification number;

generating, based on said additional stored information, a determination signal indicative of whether a message reception mode or an information reception mode is set for said call number; and performing a data conversion to said reception data when said information reception mode is set, based on a data conversion format corresponding to said matched call number to produce a new data.

10. A method according to claim 9, further comprising storing said new data in a storage unit.

11. A method according to claim 9, further comprising:

when said determination signal indicates said information reception mode, determining whether any previously converted data is stored for said matched identification number as old data;

retrieving any said old data;

integrating said old data and said new data to produce an integration data;

storing said integration data to replace said old data; and displaying at least one of said integration data and said new data.

12. A method according to claim 11, wherein said displaying said integration data includes displaying said integration data in a graph form.

13. A method according to claim 9, further comprising:

previously designating said data conversion format corresponding to said call number, said designation in response to an instruction from a user.

14. A method according to claim 13, wherein said designating comprises previously selecting one of a plurality of data conversion formats previously stored in said memory.

15. A wireless apparatus comprising:

storage means for storing at least one identification number and at least one data conversion format, each said at least one identification number having an associated first indicator indicating a reception mode, said reception mode being one of a message reception mode and an information reception mode, such that each said at least one identification number having information reception mode as said first indicator has an associated second indicator pointing to one of said at least one data conversion formats;

receiving means for receiving a wireless signal, and for extracting from said received signal a call number and a reception data;

determining means for determining from said first identicator whether a message reception mode or an information reception mode is set for said call number and to generate a determination signal;

converting means for performing a data conversion when said information reception mode is set to said reception data, said data conversion based on a data conversion format corresponding to said second indicator associated with said identification number matching said call number; and display means.

16. A wireless apparatus according to claim 15, further comprising:

storage means for storing data which has been already subjected to said data conversion as old data, wherein said converting means additionally integrates said old data and said new data to produce an integration data and said display means displays at least one of said integration and said new data.

17. A wireless apparatus according to claim 16, wherein said displaying means displays said integration data in a graph form.

18. A wireless apparatus according to claim 15, wherein said converting means stores a plurality of data conversion formats and said wireless apparatus further comprises:

selecting means for designating one of the plurality of data conversion formats corresponding to said call number in response to the instruction from a user.

19. A method of receiving a temporal change of a received data in a wireless apparatus, comprising:

storing a plurality of identification numbers in a memory, each identification number having an associated reception mode indicating one of a normal message reception mode and an information reception mode;

storing a plurality of data conversion formats in said memory;

storing an associated format indicator for each of said identification numbers having said information reception mode, said associated format indicator signifying which one of said plurality of data conversion formats is to be performed on data received under said identification number;

receiving data as a wireless signal, said received data having a call number and a received data;

determining whether said call number matches any of said plurality of identification numbers; and if said received call number matches an identification number from said plurality of identification numbers, further determining said associated reception mode to said matched identification number.

20. The method of claim 19, further comprising:

if said associated reception mode is said normal reception mode, then displaying said received data;

if said associated reception is said information reception mode, further determining whether any previously con verted data is stored in said memory associated with said matched identification number as old data, determining said format indicator of said matched identification number, and performing a data conversion on said received data in accordance with said format indicator of said matched identification number, said received data as converted by said data conversion to become a temporal update; and at least one of the following:
   displaying said temporal update;
   displaying said temporal update and said old data;
   storing said temporal update; and
   storing said temporal update and said old data to become a replacement of said old data.

\* \* \* \* \*